INVENTORS
Shinichiro Terao
Tadashi Hinago
By Stevens, Davis, Miller & Mosher
Attorneys

3,266,872
REACTION AND SEPARATION APPARATUS

Shinichiro Terao, Ashiya-shi, and Tadashi Hinago, Oita-shi, Japan, assignors to Sumitomo Chemical Company, Ltd., Higashi-ku, Osaka, Japan, a corporation of Japan
Original application Apr. 13, 1962, Ser. No. 187,248, now Patent No. 3,160,669, dated Dec. 8, 1964. Divided and this application Apr. 16, 1963, Ser. No. 273,326
2 Claims. (Cl. 23—285)

This application is a division of our copending application Serial No. 187,248, filed April 13, 1962, now Patent No. 3,160,669, issued December 8, 1964, for Emulsion Process of Producing Aromatic Nitro Compounds.

The present invention relates to an apparatus suitable for continuously producing aromatic nitro compounds.

The complex construction of the apparatus makes its administration and repair difficult, thereby sometimes causing accidents, such as explosion.

It is an object of the invention to provide an apparatus suitable for carrying out the process as above mentioned. Other objects and advantages of the invention will be apparent from the following description.

An apparatus for the continuous nitration of aromatic hydrocarbons which is suitable for carrying out the process as mentioned above, according to the invention, is provided, which apparatus comprises a reactor which is sectioned into plurality of compartments by baffle plates, which has an inlet for charge of the aromatic compound at one end of the reactor and which has at least one inlet for charge of a mixed acid comprising nitric acid and sulfuric acid at least at one compartment at any stage; agitating means provided in each compartment of the reactor; cooling means provided to adjust the temperature in the reactor; a separator connected to the other end of the reactor wherein the product is separated into the two layers of the nitrated compound phase and the spent acid phase and having outlets for withdrawal of each of the phases.

Figure 1:
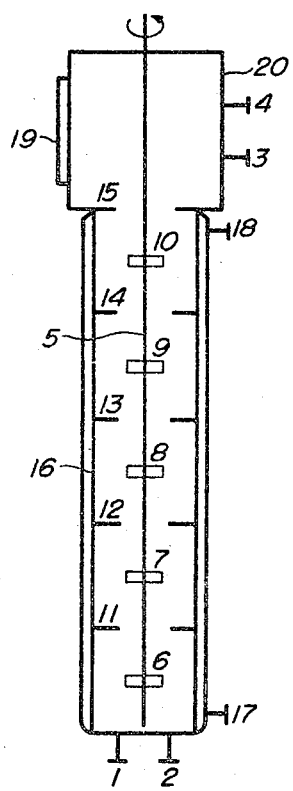
Figure 2:
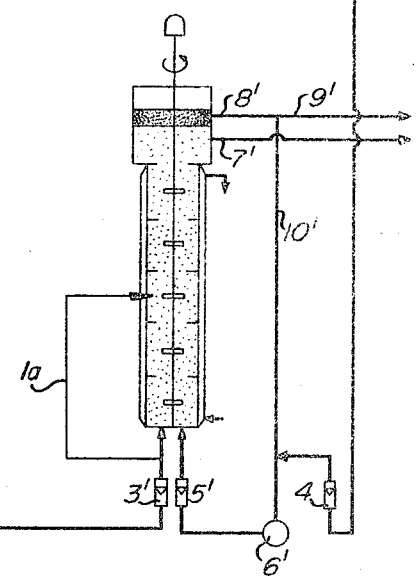
Figure 3:
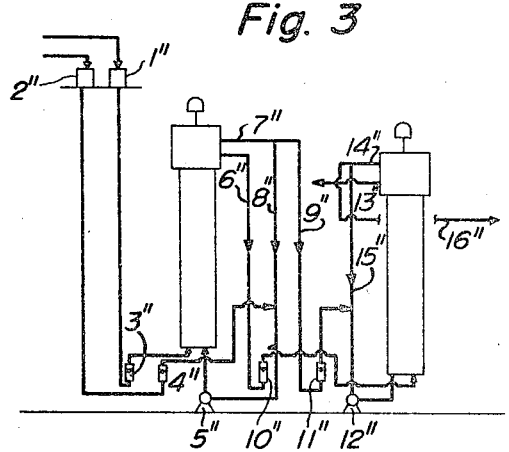

In the accompanying drawings, FIGURE 1 shows a schematic view of a longitudinal section of one example of the nitration apparatus of the invention; and FIGURES 2 and 3 illustrate diagrammatically the process of the invention.

In FIGURE 1, 1 and 2 show inlets of the charges of a mixed acid comprising a nitric acid and sulfuric acid, an aromatic compound to be nitrated, respectively, through which said charges are introduced into the reaction zone at the constant rates. The reaction zone is sectioned into plurality of compartments by baffle plates, 11, 12, 13, 14 and 15, each of which has a hole at the center and is installed at the inside wall of the reactor. The agitating blades located at every compartment are shown as 6, 7, 8, 9 and 10, which are fixed on a stirrer shaft passing through the reactor, preferably with the same intrablade distance. The length of the blade may be equal to or larger or smaller than the diameter of the hole of the plate, and the liquid reaction mass is transferred upwardly through the holes of the plates in a steady state. In some cases, the reactor may be constructed which is composed of plurality of compartments sectioned by baffle plates and in which each individual agitating means is provided in each of the compartments. The charges fed at the bottom of the lowest compartment are transferred toward the upper compartments in subsequent order, while being subjected to stirring in each compartment.

A separating room or separator 20 is mounted at the top of the reaction zone, and has preferably a larger diameter than that of the reaction zone. In the separator, the reaction mixture transferred from the reaction zone is allowed to separate into two phases of the nitrated organic phase and the spent acid phase according to the difference of their specific gravities. In FIGURE 1, 4 shows an outlet of the nitrated organic phase and 3 shows an outlet of the spent acid. 19 shows a sight glass, through which a boundary layer between the separated phases can be observed. 16 shows a water jacket, in which cooling water is fed from the inlet 17 and withdrawn from the outlet 18. Internal and/or external cooling equipment may be used instead of, or in combination with, the jacket. The reaction heat generating is removed off by means of the above cooling medium, and the liquid reactants are maintained at a desired and conventionally known constant temperature between about 30° C. and 80° C., depending upon the kind of the material to be nitrated.

According to the present apparatus, the continuous nitrating reaction of aromatic compounds with a mixed acid or a nitric acid-sulfuric acid mixture are always effected smoothly and uniformly. The aromatic compounds and the mixed acid are charged at the lowest portion of the reactor at constant rates. They react together uniformly while being transferred through the subsequent compartments with efficient agitation in each compartment, and finally the nitrated product is continuously sent to the separator.

Thus, the composition of the reaction mixture in each reaction compartment of the reactor is always constant. The reaction proceeds at the constant rate, and the resultant nitro compound and the spent acid are withdrawn from the separator at constant rates.

The baffle plate may be a perforated plate of the diameter equal to the inner diameter of the reactor. Any type of perforated plates may be employed, such as those having one hole at the center or having a number of small holes along the surface. Alternatively, the plate may be grid type or screen type.

The number of the compartments may be selected arbitrarily, but, ordinarily, three to ten or more compartments are employed.

As illustrated in FIGURE 1, the inlet pipe for the charge of the mixed acid may be located at the bottom of the reactor. In some cases, if desired or required, the inlet pipe may be located at any stage of the compartments, for example, at the middle stage. Moreover, two or more of inlet pipes for the charge of the mixed acid may be equipped at any stage of the compartments, for example, at the bottom and the middle stage.

Referring to FIGURE 2 of the accompanying drawings which illustrate a cycling system of the present process using the nitration apparatus as set forth in FIGURE 1, the desired nitrated product is taken off through the pipe 8' and divided into two parts. A part of the product is withdrawn through the pipe 9', while the other part of the compound is recycled to the reactor through the circulating pipe 10' which is connected to the charging line for the aromatic compound. Accordingly, the aromatic compound charge is always fed in combination with the nitrated product. In FIGURE 2, 1' and 2' show the mixed acid feeding tank and the aromatic compound feeding tank, respectively. 3', 4' and 5' show flowmeters, and 6' shows a circulating pump, and 7' shows a spent-acid-withdrawing pipe. As the fresh charge of the aromatic compound to be nitrated is introduced in the reactor along with a part of the nitrated product, the reaction mixture in the lowest compartment of the reactor is extremely uniform and smooth.

As the reaction mixture in the lowest compartment of the reaction zone contains an aromatic compound to be nitrated, in combination with the nitrated product, the concentration of the aromatic compound in the reaction mixture is lower than that in which no nitrated product is admixed, besides, the nitrated product serves for the emulsification of the reaction mixture. Thus, the reaction proceeds mildly and is not accompanied by higher nitro compounds byproducts, in contrast to the vigorous exothermic reaction in case of directly mixing an aromatic compound containing no nitrated product and a mixed acid as in the conventional processes.

As mentioned above, the mixed acid may be charged through an inlet pipe equipped at the bottom, or at any stage. In some cases, it may be charged through two or more inlet pipes equipped at any stage of the compartments. When it is charged, for example, through two pipes, one being equipped at the bottom and the other being approximately at the middle stage of the compartments, a better uniformity in the temperature, as well as in the acid concentration, is secured, which minimizes the production of the higher nitro compounds. A second such inlet pipe is shown at 1A in FIGURE 2.

The amount of the circulation can be selected within a broader range. The apparatus of the invention provides many advantages over the conventional nitration apparatus, even in the extreme case where no circulation is effected. However, the effectiveness of the present apparatus is much improved by employment of the circulation system, as mentioned above. The proportion of the weight of the circulating nitrated product per weight the product taken out may be 0 to as much as about 500, preferably about 1 to 200.

Further, this present invention can be more effectively carried out by employing two or more of the above-mentioned reactors in combination. This will be illustrated in FIGURE 3 of the accompanying drawings. In FIGURE 3, 1″ and 2″ are the mixed acid feed tank and the aromatic compound feed tank, respectively, from which the mixed acid and the aromatic compound are introduced into the bottom of the first reactor. The aromatic compound is continuously nitrated by the mixed acid while it is passed through the first reactor as described in the FIGURES 1 and 2. The resultant reaction product in the first reactor is withdrawn through the nitrated organic phase outlet 7″, while the partially spent acid phase is withdrawn through the spent acid outlet 6″. A portion of the nitrated organic phase is recycled through a circulating pipe 8″ to the first reactor along with the feed aromatic compound fed from the feed tank 2″. The balance of the nitrated organic phase from the first apparatus is transferred to the second reactor through the pipe 9″. The partially spent acid withdrawn from the first reactor is introduced to the second reactor through the partially spent acid pipe 6″. In the second reactor, the nitrated organic phase and the partially spent acid from the first reactor react with each other, similarly as in the first reactor. A portion of the nitrated compound withdrawn through the outlet pipe 14″ in the second reactor is recycled to the lower part of the second reactor through the circulating pipe 15″. The balance of the nitrated compound is withdrawn through the outlet pipe 16″. The spent acid in the second reactor is taken out through the outlet pipe 13″. In the figure, 3″, 4″, 10″ and 11″ show flowmeters, and 5″ and 12″ show circulating pumps.

The aromatic compound which can be nitrated according to the present invention is selected from the group consisting of aromatic hydrocarbons and chlorinated and nitrated compounds thereof. Thus, benzene, toluene, chlorobenzene, and the like, can be nitrated to yield the corresponding mononitro compounds, while, nitrobenzene, nitrotoluene, and the like, can be nitrated to yield the corresponding dinitro compounds.

The mixed acid used in the present invention may have any composition comprising nitric acid and sulfuric acid, which is employed for the mixed acid-nitration process in general. The typical and preferable composition of the mixed acid is, however, within the ranges of 30% to 50% of nitric acid, 50% to 60% of sulfuric acid, and 5% to 15% of water. The spent acid withdrawn from the separator contains sulfuric acid and a little amount of nitric acid, which may be reused for make-up of the fresh mixed acid after removal of any organic contaminants.

The amount of the mixed acid charged to the reaction zone, based upon the amount of the aromatic compound material, is freely selected according to the knowledge in the conventional nitration process, but an amount of about 1 to 3 times by weight per amount of the aromatic compound is preferable in general.

The apparatus for continuously producing aromatic compounds, according to the invention, will be more fully illustrated with reference to the following examples, which are, however, set forth merely by way of illustration and not by way of limitation.

*Example 1*

Benzene was mono-nitrated, using the nitration apparatus shown in FIGURE 1. Benzene and a mixed acid comprising nitric acid and sulfuric acid (33% by weight of nitric acid) were continuously introduced to the bottom of the reactor at the rates of 12 kg./day and 30 kg./day, respectively, and the product was continuously withdrawn from the separator. The reaction zone was kept at 40° C., and the stirrer was rotated at 300 r.p.m. The reaction ratio, namely the yield, was 96% to 98%.

*Example 2*

Toluene was mono-nitrated, as in Example 1. Toluene and the mixed acid same as that in Example 1 were continuously introduced to the bottom of the reactor at the rates of 20 kg./day and 41.6 kg./day, respectively, and the product was continuously withdrawn from the separator. The reaction zone was kept at 40° C., and the stirrer was rotated at 300 r.p.m. The reaction ratio, namely the yield, was 96% to 98%.

*Example 3*

Chlorobenzene was mono-nitrated, as in Example 1. Chlorobenzene and the mixed acid same as that in Example 1 were continuously introduced to the bottom of the reactor at the rates of 18 kg./day and 30.6 kg./day, respectively, and the product was continuously withdrawn from the separator. The reaction zone was kept at 60° C., and the stirrer was rotated at 300 r.p.m. The reaction ratio, namely the yield, was 96% to 98%.

*Example 4*

Benzene was mono-nitrated, using the reaction apparatus as shown in FIGURE 2. Benzene and the mixed acid same as that used in Example 1 were introduced to the bottom of the reactor at the rates of 12 kg./day, and 30 kg./day, respectively. The reaction zone was kept at 40° C., and the stirrer was rotated at 300 r.p.m. A part of the produced nitro-benzene was recycled at the rate of 2.5 liters/min. The reaction yield was 98%, and 18.2 kg./day of nitrobenzene was obtained.

*Example 5*

Toluene was mono-nitrated, as in Example 4. Toluene and the mixed acid same as that used in Example 1 were introduced to the bottom of the reaction apparatus at the constant rates of 20 kg./day, and 41.6 kg./day, respectively. The temperature in the reactor was kept at 40° C., the stirrer rotated at 300 r.p.m., and a part of the produced nitrotoluene was recycled at the rate of 1 liter/min. The reaction yield was 98%, and 28.5 kg./day of nitrotoluene was obtained.

*Example 6*

Chlorobenzene was mono-nitrated, as in Example 4. Chlorobenzene and the mixed acid same as that used in Example 1 were introduced to the bottom of the reaction apparatus at the constant rates of 18 kg./day and 30.6 kg./day, respectively. The temperature of the reactor was kept at 60° C., the stirrer rotated at 300 r.p.m. and the produced chloronitrobenzene was recycled to the reactor at the rate of 2 liters/min. The reaction yield was 98% and 24.5 kg./day of chloronitrobenzene was obtained.

*Example 7*

Benzene was mono-nitrated, using the reaction apparatus shown in FIGURE 3. Benzene and the mixed acid same as that used in Example 1 were introduced to the bottom of the first reactor at the rates of 79.2 kg./day and 197 kg./day, respectively. The temperatures of the first and the second reactors were kept at 40° C. and 50° C., respectively, rotating the stirrers at 300 r.p.m. A part of the produced nitrobenzene were recycled at the rate of 2.5 liters/min., in each reactor. The reactions in the first reactor was 94%, and that in the second 99%. 120 kg./day of nitrobenzene was finally obtained.

*Example 8*

Toluene was mono-nitrated, as in Example 7. Toluene and the mixed acid same as that used in Example 1 were introduced to the first reactor at the rates of 132 kg./day and 274 kg./day, respectively. The temperatures of the first and the second reactors were kept at 35° C. and 40° C., respectively, the stirrers rotated at 300 r.p.m., and a part of the produced nitrotoluene was recycled to the first and to the second reactors at the rates of 2.0 liters/min. and 1 liter/min. respectively. The reactions in the first and in the second reactors were 93% and 98%, respectively. 188 kg./day of nitrotoluene was finally obtained.

*Example 9*

Chlorobenzene was mono-nitrated, as in Example 7. Chlorobenzene and the mixed acid same as that used in Example 1 were introduced to the bottom of the first reactor at the rates of 118 kg./day and 200 kg./day, respectively. The temperature of the first and the second reactors were kept at 45° C. and 60° C., respectively, the stirrers rotated at 300 r.p.m., and a part of the produced chloronitrobenzene was recycled at the rates of 2 liters/min. in each reactor. The reactions in the first and the second reactors were 90% and 98%, respectively, and 160 kg./day of chloronitrobenzene was obtained.

What is claimed is:

1. An apparatus for the continuous nitration of aromatic compounds, which comprises a reactor sectioned into a plurality of compartments by baffle plates, an inlet for charging an aromatic compound at one end of said reactor, an inlet for charging a mixed acid at said end of said reactor, at least one additional inlet for charging mixed acid to another compartment of said reactor, agitating means provided in each of said compartments, cooling means to adjust the temperature of said reactor, a separator connected to the other end of said reactor wherein the product is separated into two layers, outlet means for separately withdrawing each of said layers, and means to circulate a portion of the lighter of the two product layers to said inlet for charging mixed acid.

2. An apparatus for the continuous nitration of aromatic compounds, which comprises a reactor sectioned into a plurality of compartments by baffle plates, an inlet for charging an aromatic compound at one end of said reactor, at least one inlet for charging a mixed acid to said reactor adjacent said first mentioned inlet, agitating means provided in each of said compartments, cooling means to adjust the temperature in said reactor, a separator connected to the other end of said reactor for separating the product into lighter and heavier layers, outlet means for separately withdrawing each of said layers, means to circulate a portion of said lighter layer to said inlet for the charging of an aromatic compound, a second reactor sectioned into a plurality of compartments by baffle plates and having agitating means provided in each of said compartments, cooling means to adjust the temperature in said second reactor, an inlet at one end of said second reactor, means to supply a portion of said lighter layer from the separator of the first mentioned reactor to said inlet of said second reactor, means to supply said heavier layer from the separator of said first mentioned reactor to said one end of said second reactor, a separator connected to the other end of said second reactor for separating the product into lighter and heavier layers, and means to circulate a portion of said last mentioned lighter layer to said inlet of said second reactor.

References Cited by the Examiner

UNITED STATES PATENTS

| | | | |
|---|---|---|---|
| 2,729,549 | 1/1956 | Reman et al. | 23—310 |
| 3,162,510 | 12/1964 | Meissner et al. | 23—266 X |

MORRIS O. WOLK, *Primary Examiner.*

JAMES H. TAYMAN, JR., *Examiner.*